US012649649B2

(12) United States Patent
Moore

(10) Patent No.: US 12,649,649 B2
(45) Date of Patent: Jun. 9, 2026

(54) FLEXIBLE BEVERAGE DISPENSING SYSTEM

(71) Applicant: THE COCA-COLA COMPANY, Atlanta, GA (US)

(72) Inventor: William J. Moore, Lilburn, GA (US)

(73) Assignee: THE COCA-COLA COMPANY, Atlanta, GA (US)

(*) Notice: Subject to any disclaimer, the term of this patent is extended or adjusted under 35 U.S.C. 154(b) by 5 days.

(21) Appl. No.: 18/452,717

(22) Filed: Aug. 21, 2023

(65) Prior Publication Data

US 2023/0391599 A1 Dec. 7, 2023

Related U.S. Application Data

(63) Continuation of application No. 16/468,501, filed as application No. PCT/US2017/066142 on Dec. 13, 2017, now Pat. No. 11,834,319.

(Continued)

(51) Int. Cl.
*B67D 1/00* (2006.01)
*B67D 1/08* (2006.01)
(Continued)

(52) U.S. Cl.
CPC ........... *B67D 1/0037* (2013.01); *B67D 1/006* (2013.01); *B67D 1/0079* (2013.01);
(Continued)

(58) Field of Classification Search
CPC ...... B67D 1/0855; B67D 1/0888; B67D 1/10; B67D 1/1211; B67D 1/0032;
(Continued)

(56) References Cited

U.S. PATENT DOCUMENTS 4,666,584 A * 5/1987 Luckenbach .......... C10G 11/18 502/50
4,753,370 A * 6/1988 Rudick ................ B67D 1/0051 222/105

(Continued)

FOREIGN PATENT DOCUMENTS

EP 0530272 A1 3/1993
WO 0046143 A1 8/2000

(Continued)

OTHER PUBLICATIONS

Calibrate merriam-webster.pdf; obtained on May 17, 2025 from: https://www.merriam-webster.com/thesaurus/calibrate.*

(Continued)

*Primary Examiner* — Paul R Durand
*Assistant Examiner* — Randall A Gruby
(74) *Attorney, Agent, or Firm* — Eversheds Sutherland (US) LLP

(57) ABSTRACT

The present application provides a beverage dispensing system. The beverage dispensing system may include a diluent line in communication with a diluent, a flow meter and a variable flow control module positioned on the diluent line, a number of syrup lines in communication with a number of syrups, and a fixed flow control module positioned on the syrup lines. The variable flow control module controls the flow rate of the diluent through the diluent line based upon the flow rate of one of the syrups through one of the syrup lines.

14 Claims, 3 Drawing Sheets

Related U.S. Application Data

(60) Provisional application No. 62/433,893, filed on Dec. 14, 2016.

(51) Int. Cl.
*B67D 1/10* (2006.01)
*B67D 1/12* (2006.01)

(52) U.S. Cl.
CPC .... *B67D 2001/0827* (2013.01); *B67D 1/0855* (2013.01); *B67D 1/0888* (2013.01); *B67D 1/10* (2013.01); *B67D 1/1211* (2013.01)

(58) Field of Classification Search
CPC .. B67D 1/0039; B67D 1/0027; B67D 1/1218; B67D 2001/0827
See application file for complete search history.

(56) References Cited

U.S. PATENT DOCUMENTS 4,821,925 A * 4/1989 Wiley .................. B67D 1/0035 137/884
4,827,426 A * 5/1989 Patton .................. G07F 13/065 700/240
5,033,644 A * 7/1991 Tentler .................. B67D 1/1218 222/63
5,179,970 A * 1/1993 Jarocki .................. B67D 1/0855 251/129.08
5,190,188 A * 3/1993 Credle, Jr. .................. B67D 1/0034 312/236
5,381,926 A * 1/1995 Credle, Jr. .................. B67D 1/0032 222/1
5,906,296 A * 5/1999 Martindale .................. B67C 3/2608 222/108
6,053,361 A * 4/2000 Hills .................. B67D 1/1247 417/63
6,053,631 A * 4/2000 Mock .................. G04B 39/025 368/294
6,234,349 B1 5/2001 Bilskie et al.
6,394,312 B1 * 5/2002 Endou .................. B67D 1/0032 222/63
6,609,431 B1 * 8/2003 Tietsworth .................. G01F 1/36 73/861.52
6,648,240 B2 * 11/2003 Simmons .................. B67D 1/0032 239/398
7,036,686 B2 * 5/2006 Newton .................. B67D 1/1222 222/145.5
7,060,848 B2 * 6/2006 Boussie .................. C07F 9/5022 556/54
7,077,290 B2 * 7/2006 Bethuy .................. B67D 1/1218 222/23
7,091,292 B2 * 8/2006 Boussie .................. C08F 10/00 568/585
7,288,692 B2 * 10/2007 Kuechler .................. C07C 7/005 585/638
7,578,415 B2 * 8/2009 Ziesel .................. B67D 1/0085 222/129.1
7,757,896 B2 * 7/2010 Carpenter .................. B67D 1/006 222/145.5
7,806,294 B2 * 10/2010 Gatipon .................. B67D 1/0022 222/1
8,087,544 B2 * 1/2012 Elsom .................. B67D 1/0031 222/129.1
8,485,394 B2 * 7/2013 Tachibana .................. B67D 1/0884 222/129.1
8,567,642 B2 * 10/2013 Hoover .................. B67D 1/0044 222/145.5
8,960,500 B2 * 2/2015 van Opstal .................. B67D 1/0044 222/145.5
9,415,992 B2 * 8/2016 Ryan .................. B01F 33/30
9,677,555 B2 * 6/2017 Kamen .................. G16H 20/17
10,377,620 B2 * 8/2019 Makino .................. B67D 1/0028
10,899,597 B2 * 1/2021 Cleland .................. B67D 1/1247
10,913,648 B2 * 2/2021 Ubidia .................. B67D 1/0888
10,981,771 B2 * 4/2021 McDougall .................. B67D 1/10
11,097,936 B2 * 8/2021 Zerilli .................. B67D 1/0032
12,054,378 B2 * 8/2024 Katz .................. B08B 3/04
12,215,013 B2 * 2/2025 Hayes-Pankhurst .................. B67D 1/0031
12,246,961 B2 * 3/2025 Hejna .................. B67D 1/124
2001/0019067 A1 * 9/2001 Durham .................. B67D 1/0032 222/129.1
2002/0008163 A1 * 1/2002 Simmons .................. B67D 1/0032 239/413
2002/0023935 A1 * 2/2002 Heyes .................. B67D 1/0012 222/129.1
2003/0015551 A1 * 1/2003 Henry .................. B67D 1/1234 222/129.3
2004/0000560 A1 * 1/2004 Henry .................. B67D 1/14 222/59
2004/0045983 A1 3/2004 McCann et al.
2004/0084475 A1 5/2004 Bethuy et al.
2005/0142400 A1 * 6/2005 Turco .................. H01M 8/04589 429/444
2006/0025548 A1 * 2/2006 Boussie .................. C08F 10/00 526/348
2010/0224649 A1 * 9/2010 Hoover .................. B67D 1/0021 222/145.6
2011/0042414 A1 2/2011 Tachibana et al.
2012/0160871 A1 6/2012 Carpenter et al.
2012/0228328 A1 * 9/2012 Ryan .................. B67D 1/0043 222/129.4
2013/0140328 A1 * 6/2013 Gates .................. B67D 1/0892 134/22.18
2014/0263407 A1 * 9/2014 Rudick .................. B67D 3/0019 137/511
2015/0251889 A1 * 9/2015 Quittner .................. B01F 23/2363 417/374
2017/0101298 A1 * 4/2017 Renzi .................. B67D 1/0027
2019/0185311 A1 * 6/2019 Karol .................. B67D 1/0081
2020/0003325 A1 * 1/2020 Byle .................. F16K 27/029
2020/0010311 A1 * 1/2020 Moore .................. B67D 1/0027
2020/0223682 A1 * 7/2020 Lane .................. G16H 20/60
2020/0331739 A1 * 10/2020 Mehta .................. B67C 3/06
2020/0331743 A1 * 10/2020 Cook .................. B67D 1/1284
2020/0346915 A1 * 11/2020 Cook .................. B67D 1/0031
2020/0369505 A1 * 11/2020 Mckay .................. B67D 1/10
2021/0009398 A1 * 1/2021 Zerilli .................. B67D 1/0032
2021/0017011 A1 * 1/2021 von Kraus .................. B67D 1/0021
2021/0032087 A1 * 2/2021 Tessicini .................. B67D 1/0074
2021/0130148 A1 * 5/2021 Zemko .................. B67D 1/005
2021/0130150 A1 5/2021 Ubidia
2023/0059921 A1 * 2/2023 Watson .................. G01N 33/566
2024/0404677 A1 * 12/2024 Kamen .................. A61M 5/1415
2025/0100866 A1 * 3/2025 McGrane .................. B67D 1/0855

FOREIGN PATENT DOCUMENTS

WO 02/27276 A2 4/2002
WO 2009/136474 A1 11/2009
WO 2014/036127 A1 3/2014
WO 2015/181742 A1 12/2015
WO 2016/057869 A1 4/2016

OTHER PUBLICATIONS

American Heritage Dictionary Entry_ valve.pdf; obtained on Sep. 4, 2025 from: https://www.ahdictionary.com/word/search.html?q=valve.*
American Heritage Dictionary Entry_ calibrate.pdf; obtained on Sep. 4, 2025 from: https://www.ahdictionary.com/word/search.html?q=calibrate.*
International Search Report and Written Opinion, PCT/US2017/066142, Mar. 29, 2018 (13 pp.).
EP Extended Search Report for EP 17881604.7, dated Jun. 15, 2020 (9 pp.).

* cited by examiner

FLEXIBLE BEVERAGE DISPENSING SYSTEM

TECHNICAL FIELD

The present application and the resultant patent relate generally to a beverage dispensing system and more particularly relate to a flexible beverage dispensing system that can accommodate different types of ingredients in a simplified system capable of dispensing a significant number of beverages.

BACKGROUND OF THE INVENTION

Current post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios. These micro-ingredients then may be stored in much smaller packages and stored closer to, adjacent to, or within the beverage dispenser itself. The beverage dispenser preferably may provide the consumer with multiple beverage options as well as the ability to customize the beverage as desired.

In order to accommodate this variety, a beverage dispenser needs to accommodate fluids with different viscosities, flow rates, mixing ratios, temperatures, and other variables. Specifically, beverage dispensers generally include a number of pumps and other types of flow control devices so as to distribute the various fluids therein. A beverage dispenser thus must accurately dispense a predetermined volume and/or a predetermined flow rate of a first fluid such as a micro-ingredient or a syrup to be mixed with a predetermined volume and/or a predetermined flow rate of a second fluid such as diluent. The failure to provide the predetermined volumes at the predetermined flow rates of the fluids may result in an improperly mixed and, hence, an unsatisfactory beverage. The pumps and other types of flow control devices, however, may be relatively expensive and may require regular cleaning and maintenance. Moreover, the pumps and other types of flow control devices designed for conventional beverage syrups may not accommodate, for example, other types of beverage ingredients such as the micro-ingredients.

SUMMARY OF THE INVENTION

The present application and the resultant patent thus provide a beverage dispensing system. The beverage dispensing system may include a diluent line in communication with a diluent, a flow meter and a variable flow control module positioned on the diluent line, a number of syrup lines in communication with a number of syrups, and a fixed flow control module positioned on the syrup lines. The variable flow control module controls the flow rate of the diluent through the diluent line based upon the flow rate of one of the syrups through one of the syrup lines.

The present application and the resultant patent further provide a method of dispensing a beverage. The method may include the steps of determining a flow rate of a syrup to a nozzle, flowing the syrup to the nozzle in an open loop manner, and flowing a diluent to the nozzle in a closed loop manner based upon the determined flow rate of the syrup.

The present application and the resultant patent further provide a beverage dispensing system. The beverage dispensing system may include a diluent line in communication with a diluent flow, a flow meter positioned on the diluent line, a number of micro-ingredient lines in communication with a number of micro-ingredient flows, a sweetener line in communication with a sweetener flow, and a number of positive displacement pumps positioned on the micro-ingredient lines and the sweetener line. The positive displacement pumps control the flow rate of the micro-ingredients through the micro-ingredient lines and the flow rate of the sweetener through the sweetener line based upon the flow rate of the diluent through the diluent line as determined by the flow meter.

These and other features and improvements of the present application and the resultant patent will become apparent to one of ordinary skill in the art upon review of the following detailed description when taken in conjunction with the shown drawings and the appended claims.

DETAILED DESCRIPTION

Figure 1:
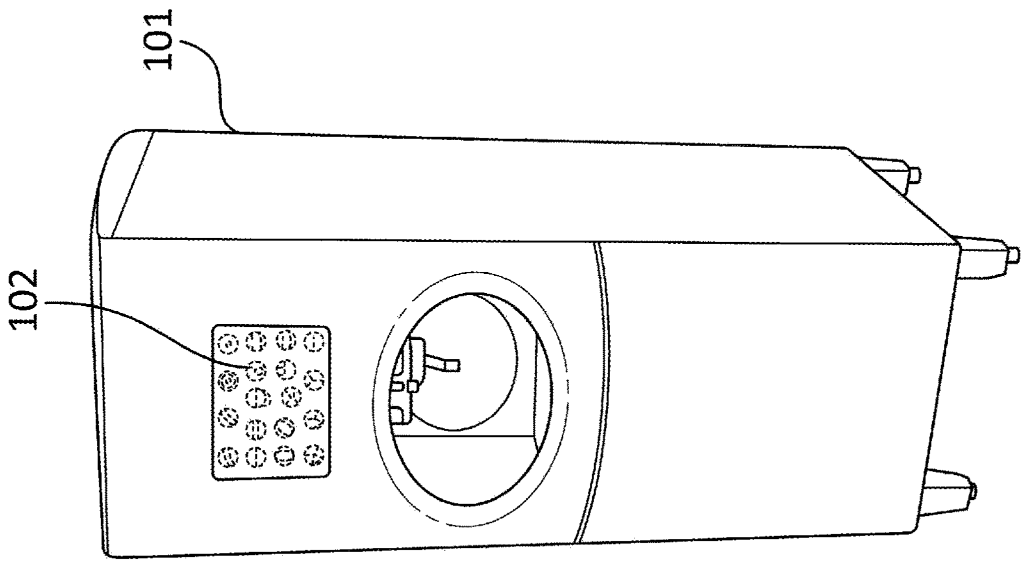
FIG. 1 is a perspective view of a beverage dispensing system as may be described herein.

Referring now to the drawings, in which like numerals refer to like elements throughout the several views, FIG. 1 shows an example of a beverage dispensing system 100 as may be described herein. The beverage dispensing system 100 may dispense many different types of beverages or other types of fluids. Specifically, the beverage dispensing system 100 may be used with diluents, micro-ingredients, macro-ingredients, and other types of fluids. The diluents generally include plain water (still water or non-carbonated water), carbonated water, and other fluids.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), FIS ("Fully Inverted Sugar"), MIS ("Medium Inverted Sugar"), concentrated extracts, purees, and similar types of ingredients. Other ingredients may include traditional BIB ("bag-in-box") flavored syrups, nutritive and non-nutritive sweetener blends, juice concentrates, dairy products, soy, and rice concentrates. Similarly, a macro-ingredient base product may include the sweetener as well as flavorings, acids, and other common components of a beverage syrup. The beverage syrup with sugar, HFCS, or other macro-ingredient base products generally may be stored in a conventional bag-in-box container remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Figure 2:
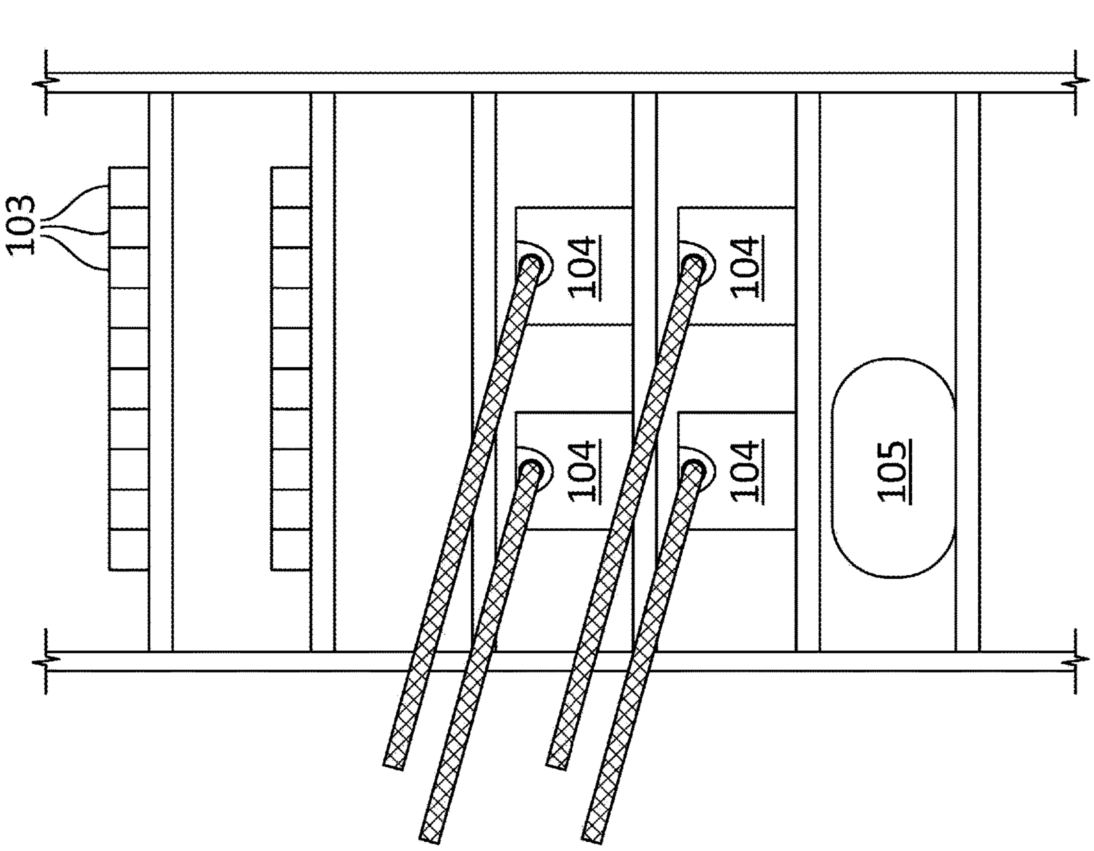
FIG. 2 is a schematic diagram of a back room configuration for use with the beverage dispensing system of FIG. 1.

The beverage dispensing system 100 may include an outer frame 101 and a user interface 102. A consumer may select a beverage via the user interface 102. Likewise, diagnostic information and other types of information may be disclosed on the user interface 102. The micro-ingredients may be stored within the outer frame 101 in cartridges 103 and similar types of containers. As is shown in FIG. 2, legacy ingredients such as conventional syrups and the like in bag-in-box containers 104 and other types of containers may be stored remotely from the out frame 101 in, for example, a back room or other location with the syrups pumped to the beverage dispensing system 100. Other components such as a carbon dioxide source 105 also may be stored remotely. Replacement micro-ingredient cartridges 103 also may be stored remotely and inserted within the outer frame 101 as needed. Other components and other configurations may be used herein.

Figure 3:
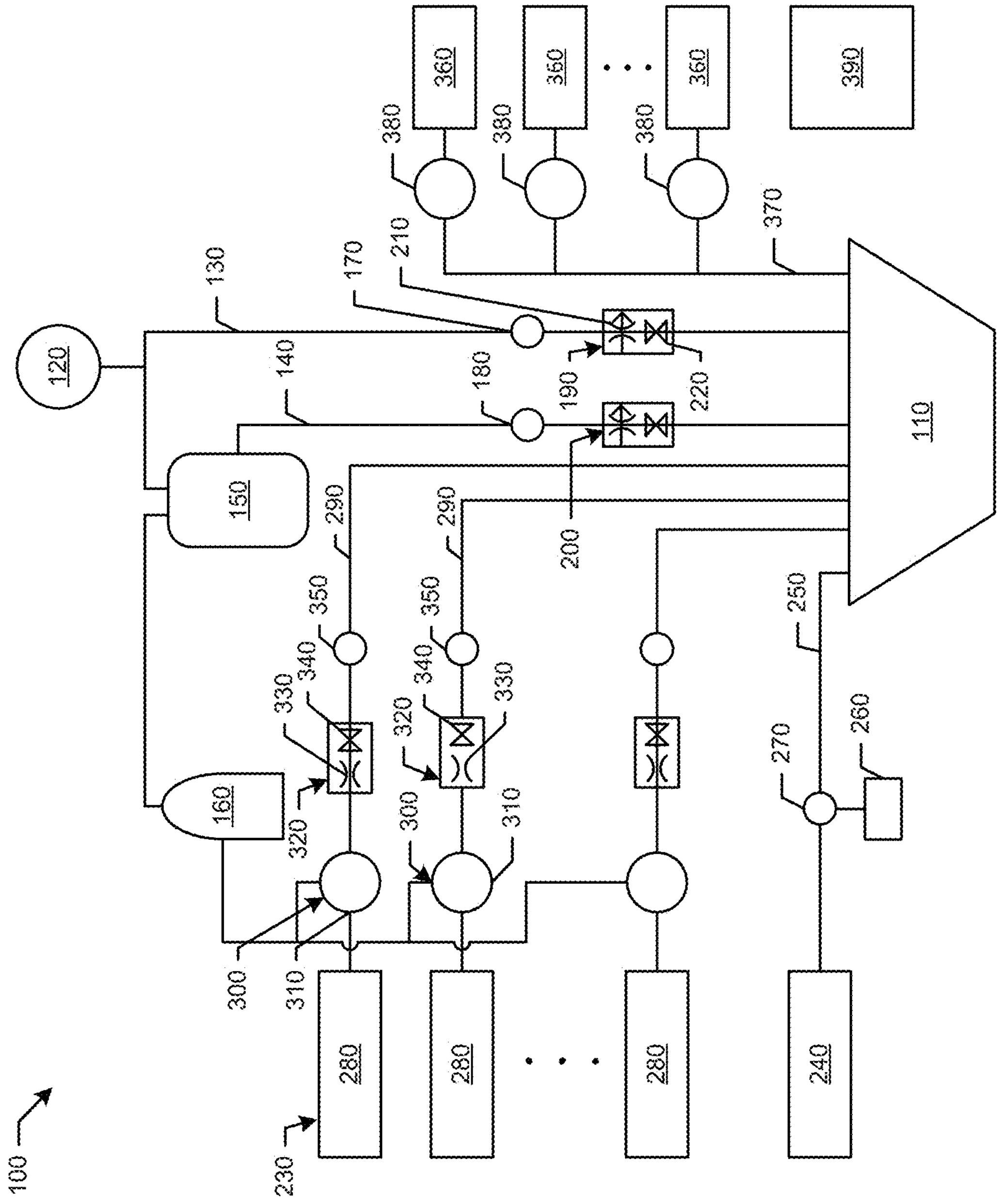
FIG. 3 is a schematic diagram of the beverage dispensing system of FIG. 1.

FIG. 3 shows a schematic diagram of the components of the beverage dispensing system 100. The beverage dispensing system 100 may dispense these beverages and/or other fluids via a nozzle 110. The nozzle 110 may be a multi-flavor dispensing valve capable of mixing a number of fluids at the same time. A suitable example of the multi-flavor nozzle 110 may be shown in commonly owned U.S. Patent Publication No. 2015/0315006, entitled "Common Dispensing Nozzle Assembly." The nozzle 110 may have any suitable size, shape, or configuration.

The nozzle 110 may be in communication with one or more diluent sources 120. In this example, the nozzle 110 may be in communication with the diluent source 120 via a plain water line 130 and a carbonated water line 140. The diluent source 120 may have any suitable size, shape, or configuration. The carbonated water line 140 may be in communication with a carbonator 150. The carbonator 150 may be of conventional design. The carbonator 150 also may be in communication with a carbon dioxide source 160. The carbon dioxide source 160 may have any suitable size, shape, or configuration. The carbonator 150 serves to mix the diluent and carbon dioxide to produce the carbonated water. The carbonated water also may be mixed with the plain water to create a mid-carbonated flow.

The plain water line 130 may have a plain water flow meter 170 positioned thereon. Likewise, the carbonated water line 140 may have a carbonated water flow meter 180 positioned thereon. The flow meters 170, 180 may include a paddle wheel device, a turbine device, a gear meter, or any type of conventional metering device. The plain water line 130 may have a plain water variable flow control module 190 positioned thereon. The carbonated water line 140 also may have a carbonated water variable flow control module 200 positioned thereon. The variable flow control modules 190, 200 each may include a proportional control valve 210 and a solenoid valve 220 positioned therein. The proportional control valve 210 may operate via pulse width modulation, a variable orifice, or other conventional types of flow control means. The proportional control valve 210 may vary the flow rate of the diluent therethrough. The solenoid valve 220 may be a conventional on and off valve and the like. The flow meters 170, 180 may provide feedback to the proportional control valves 210 so as to control the flow rate of the diluent therethrough. Other components and other configurations may be used herein.

The beverage dispensing system 100 may have a number of macro-ingredient sources 230 in communication with the nozzle 110. One of the macro-ingredient sources 230 may be a sweetener source 240. In this example, the sweetener source 240 may include a high fructose corn syrup (HFCS) sweetener. Other types of sweeteners may be used herein. The sweetener source 240 may have any suitable size, shape, or configuration. The sweetener source 240 may be in communication with the nozzle 110 via a sweetener line 250. A controlled gear pump 260 with an air vent 270 thereon may be used to pump the HFCS or other type of sweetener to the nozzle 110. Other types of positive displacement pumps and other types of pumping devices may be used herein. The controlled gear pump 260 may have any suitable size, shape, configuration, or capacity. More than one pump may be used herein. Other components and other configurations may be used herein.

The macro-ingredients sources 230 also may include a number of bag-in-box sources 280. The bag-in-box sources 280 may contain conventional beverage syrups or concentrates generally used to create a branded soft drink and other types of beverages. Any number of the bag-in-box sources 280 may be used herein. The bag-in-box sources 280 may have any suitable size, shape, or configuration. The bag-in-box sources 280 may be in communication with the nozzle 110 via a number of bag-in-box lines 290. Each of the bag-in-box lines 290 may have a bag-in-box pump 300 thereon. In this example, the bag-in-box pump 300 may be a pneumatic pump 310. The pneumatic pump 310 may be driven by carbon dioxide from the carbon dioxide source 160 or elsewhere. The bag-in-box pumps 300 may have any suitable size, shape, configuration, or capacity. Other types of pumping devices may be used herein. Each of the bag-in-box lines 290 also may have a fixed flow control module 320 thereon. The fixed flow control modules 320 may include a flow control valve 330 and a solenoid valve 340 therein. The flow control valve 330 may be a mechanically fixed flow control device. The flow control valve 330 may be calibrated for a predetermined flow rate therethrough. The solenoid valve 340 may be of conventional design. Optionally, one or more of the bag-in-box lines 290 also may have a flow meter 350 thereon. The flow meter 350 may be of conventional design. Other components and other configurations may be used herein.

The beverage dispenser system 100 also may include a number of micro-ingredient sources 360 in communication with the nozzle 110. The micro-ingredient sources 360 may be in the form of cartridges or any other type of container within or adjacent to the beverage dispensing system 100 or elsewhere. The micro-ingredient sources 360 may have any suitable size, shape, or configuration. The micro-ingredient sources 360 may be in communication with the nozzle 110 via a number of micro-ingredient lines 370. Each of the micro-ingredient lines 370 may have a micro-ingredient pump 380 thereon. The micro-ingredient pump 380 may be a positive displacement pump and the like. Examples of suitable positive displacement pumps include piston pumps, nutating pumps, gear pumps, annular pumps, peristaltic pumps, piezo pumps, and the like. The micro-ingredient pumps 380 may have any suitable size, shape, configuration, or capacity. Other types of pumping devices may be used herein. Other components and other configurations may be used herein.

Operation of the beverage dispensing system 100 may be governed by a controller 390. The controller 390 may be any type of programmable logic device with conventional input devices, output devices, memory, operating systems, and communication systems. The controller 390 may be local or remote. Multiple controllers 390 may be used herein.

In response to a request for a beverage, the controller 390 and the beverage dispensing system 100 determines the recipe of the requested beverage and instructs the appropriate pumps and valves to operate in the appropriate manner. For example, if a micro-ingredient based beverage is selected, the controller 390 may initiate the appropriate micro-ingredient pumps 380 in communication with the appropriate micro-ingredient sources 360, the appropriate variable flow control modules 190, 200 in communication with the appropriate diluent source 120, and the controlled gear pump 260 in communication with the sweetener source 240. A number of the micro-ingredients, the diluent, and the HFCS thus may be mixed at the nozzle 110 to create the requested beverage.

Likewise if a branded or bag-in-box beverage is requested, the controller 390 may instruct the appropriate variable flow control module 180,190 in communication with the appropriate diluent source 120 and the appropriate bag-in-box pump 300 in communication with the appropriate bag-in-box source 280. If a flavor shot is requested, the controller 390 also will instruct the appropriate micro-ingredient pump 380 in communication with the appropriate micro-ingredient source 360. The syrup, the diluent, and the micro-ingredient thus may be mixed at the nozzle 110 to create the requested beverage.

In this example, the water lines 130, 140 use the variable flow control modules 170, 180 with feedback control while the bag-in-box lines 290 use the fixed flow control modules 320 without feedback control. Rather, the flow control valves 330 of the fixed flow control modules 320 may be mechanically set for a given flow rate. Based upon the flow rate of the syrup in the bag-in-box lines 290 as determined by the bag-in-box flow meter 350 if the flow meter 350 is used or based upon an assumed flow rate if the flow meter is not used, the proportional control valve in the variable flow control modules 190, 200 thus either speeds up or slows down the flow of diluent therein to ensure the correct ratio of syrup and diluent at the nozzle 110. The flow rate of the diluent thus follows the flow rate of the syrup. Likewise, the micro-ingredient pumps 380 and the controlled gear pump 260 pump the correct volumes of micro-ingredients and HFCS in the correct proportions.

The beverage dispensing system 100 thus avoids the complexity and the expense of using the proportional control valves 210 or other type of closed loop control on the bag-in-box lines 290 as well as on the diluent lines 130, 140. In a system that uses a large number of different syrups in multiple bag-in-boxes, this cost savings and reduction in complexity may be significant. Further cost-savings and further reductions in complexity may be found by not using the flow meters 350 on the bag-in-box lines 290 and rely on the predetermined flow rate therethrough. Other components and other configurations may be used herein.

Figure 4:
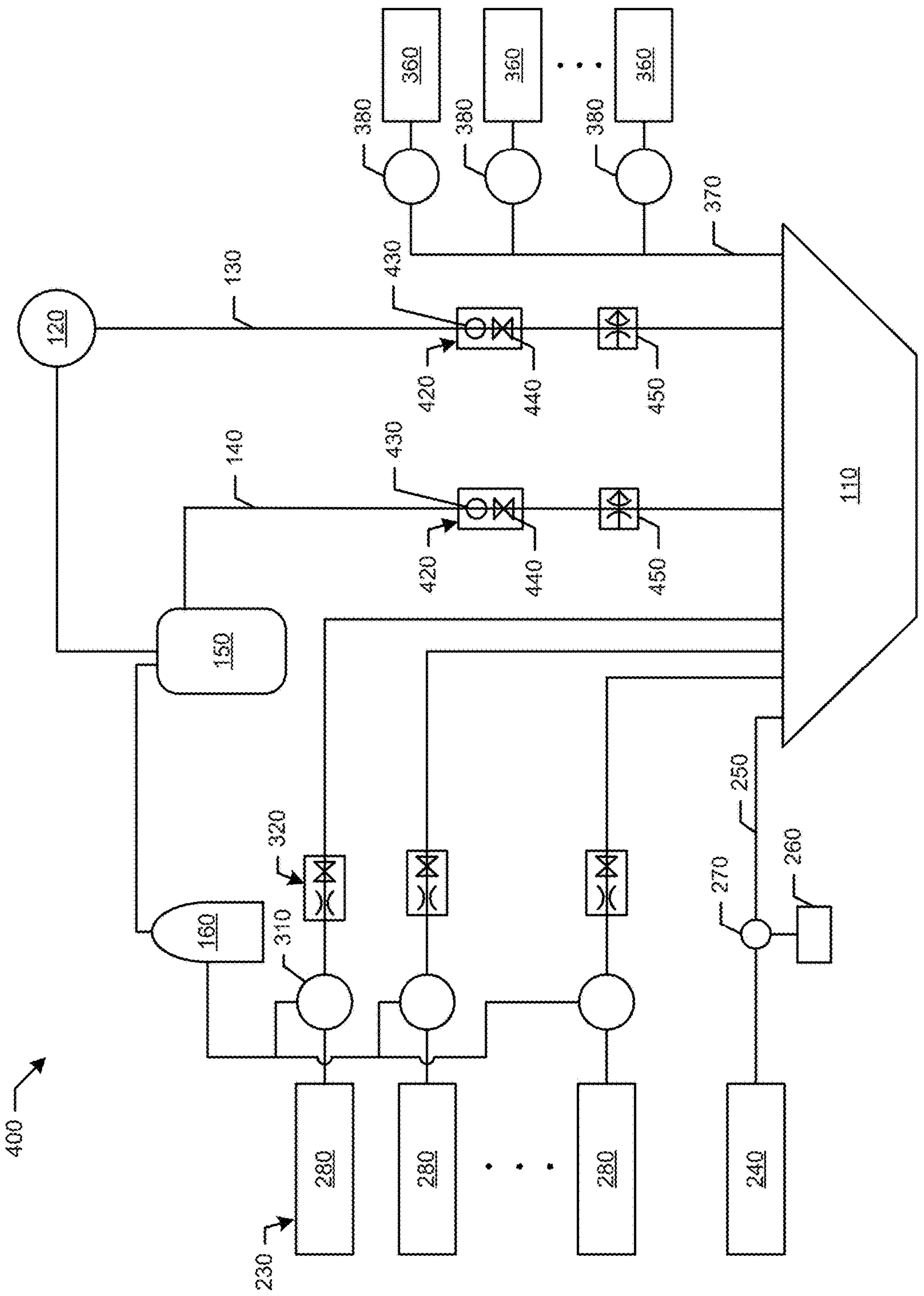
FIG. 4 is a schematic diagram of an alternate embodiment of a beverage dispensing system as may be described herein.

FIG. 4 shows alternate embodiment of a beverage dispensing system 400 as may be described herein. The beverage dispensing system 400 may be similar to that described above. A flexible flow control module 420 may be positioned on both of the water lines 130, 140. The flexible flow control module 420 may include a flexible flow meter 430, a flexible solenoid valve 440, and a flexible flow control valve 450. The flexible flow meter 430 and the flexible solenoid valve 440 may be of conventional design and similar to those described above. The flexible flow control valve 450 may be either a proportional control valve 210 with feedback or a fixed flow control valve 330 without the use of feedback. If the fixed flow control valve 330 is used for the syrup, the syrup in the bag-in-box lines 290 may flow in an open loop matter. The micro-ingredient pumps 380 may pump the micro-ingredients according to the output of the flexible flow meter 430 with respect to the flow rate of the diluent therethrough. The flow of the micro-ingredients thus follows the flow of the diluent so as to ensure the correct ratio at the nozzle 110. Alternatively, the proportional control valve 210 also could be used. In this example, only a single proportional control valve 210 may be used on the water lines 130, 140 for an additional cost savings. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A beverage dispensing system, comprising:
- a diluent line in communication with a diluent;
- a flow meter and a proportional control valve positioned on the diluent line;
- a plurality of syrup lines in communication with a plurality of syrups; and
- one or more of the plurality of syrup lines comprise a calibratable fixed flow control valve mechanically set for a given flow rate;
- wherein the proportional control valve controls a flow rate of the diluent through the diluent line based upon the flow rate of one of the plurality of syrups through one of the plurality of syrup lines.

2. The beverage dispensing system of claim 1, wherein the plurality of syrups comprises a plurality of bag-in-boxes.

3. The beverage dispensing system of claim 1, wherein one or more of the plurality of syrup lines comprise a flow meter positioned thereon.

4. The beverage dispensing system of claim 1, further comprising a plurality of micro-ingredient lines in communication with a plurality of micro-ingredients.

5. The beverage dispensing system of claim 4, wherein the plurality of micro-ingredients comprises reconstitution ratios of about ten to one or higher.

6. The beverage dispensing system of claim 4, wherein the plurality of micro-ingredient lines comprises a plurality of micro-ingredient pumps positioned thereon and wherein the plurality of micro-ingredient pumps controls the flow rate of the plurality of micro-ingredient through the plurality of micro-ingredient lines based upon the flow rate of the diluent through the diluent line.

7. The beverage dispensing system of claim 6, wherein the flow rate of the diluent is determined by the flow meter.

8. The beverage dispensing system of claim 6, wherein the flow rate of the diluent is determined by the proportional control valve.

9. The beverage dispensing system of claim 1, wherein one or more of the plurality of syrup lines comprise a pneumatic pump positioned thereon.

10. The beverage dispensing system of claim 9, wherein the pneumatic pump is in communication with a carbon dioxide source.

11. The beverage dispensing system of claim 1, further comprising a sweetener line in communication with a sweetener.

12. The beverage dispensing system of claim 11, wherein the sweetener line comprises a controlled gear pump positioned thereon.

13. The beverage dispensing system of claim 1, wherein the diluent line comprises one or more of a plain water line and a carbonated water line.

14. The beverage dispensing system of claim 1, wherein the diluent line and the plurality of syrup lines are in communication with a nozzle.

* * * * *